(12) United States Patent
Choi

(10) Patent No.: US 6,460,102 B1
(45) Date of Patent: Oct. 1, 2002

(54) SEMICONDUCTOR SYSTEM HAVING A MASTER DEVICE AND A SLAVE DEVICE

(75) Inventor: Jae Myoung Choi, Ichon (KR)

(73) Assignee: Hyundai Electronics Industries Co., Ltd., Ichon-shi (KR)

( * ) Notice: Subject to any disclaimer, the term of this patent is extended or adjusted under 35 U.S.C. 154(b) by 0 days.

(21) Appl. No.: 09/196,118

(22) Filed: Nov. 20, 1998

(30) Foreign Application Priority Data

Nov. 21, 1997 (KR) .............................................. 97-62078

(51) Int. Cl.[7] .............................................. G06F 13/00
(52) U.S. Cl. ....................................................... 710/110
(58) Field of Search ................................. 710/100, 305, 710/110; 326/21, 30, 31, 33, 63, 80

(56) References Cited

U.S. PATENT DOCUMENTS

| | | |
|---|---|---|
| 4,354,226 A | 10/1982 | Flickinger et al. |
| 5,185,878 A | 2/1993 | Baror et al. |
| 5,199,106 A | 3/1993 | Bourke et al. |
| 5,379,386 A | 1/1995 | Swarts et al. |
| 5,561,806 A | 10/1996 | Fitchett et al. |
| 5,636,370 A | 6/1997 | Sicsic et al. |
| 5,657,456 A * | 8/1997 | Gist et al. .................... 710/100 |
| 5,748,939 A | 5/1998 | Rozman et al. |
| 5,793,815 A * | 8/1998 | Goodnow et al. .......... 375/286 |

* cited by examiner

Primary Examiner—Glenn A. Auve
(74) Attorney, Agent, or Firm—Jacobson Holman, PLLC

(57) ABSTRACT

A semiconductor system having a master device and a slave device. The master device and the slave device are coupled together through the data bus and control signal line. The master device inputs a calibration signal to the slave device in response to the control signal. The voltage level of the data outputted from the slave device is corrected by the calibration operation.

18 Claims, 2 Drawing Sheets

SEMICONDUCTOR SYSTEM HAVING A MASTER DEVICE AND A SLAVE DEVICE

BACKGROUND OF THE INVENTION

1. Field of the Invention

The present invention relates to a semiconductor system having a master device and a slave device, and more particularly to a semiconductor system which corrects data being transferred between a master device and a slave device.

2. Description of the Prior Art

In general, the semiconductor system comprises the master device and the slave device. The function of the the master device is to control the operation of the the semiconductor system, and the function of the the slave device is to process a specified operation which is controlled by the master device. For example, micro-processor in the computer system can be the master device, and the peripheral circuit and memory elements can be the slave device.

The master device and the slave device are coupled with each other through the control bus and the data bus. Clock signals are transferred through tha control bus and the data bus. Analog signals also can be transferred through tha control bus and the data bus. However, the present invention refers only to clock signals being a digital type so as to correct the voltage level of the clock signals. In particular, the present invention mainly illustrates a data correction device which corrects data being transferred between a master device and a slave device.

FIG. 1 is a block diagram illustrating the construction of a conventional semiconductor system having the master device and the slave device.

As shown in this drawing, the master device is coupled with a plurality of slave devices through the control bus and data bus. In general, the master device can be a control device such as a micro-processor. Accordingly, hereinafter the master device will be called control device for the convenience of the explanation.

In FIG. 1, the control device can control simultaneously a plurality of slave devices through the control bus, and also control, indivisually, the slave devices. In addition, data are transferred from the control device to a plurality of the slave devices through the control bus and vice versa.

But then, due to the growth of technology, data have been transferred in very high switching speed and the amplitude of the data has been made very small. As a result, there is a possibility of the occurence of erroneous operation of the system. Accordingly, it is preferred to have valid values of the data that are transferred between the control device and the master device.

The semiconductor system generally includes many types of the slave devices which are produced by a variety of corporations. In addition, because the states of the system board such as different distances between the power supply voltage and the slave devices are different, there is a possibility an abnormal operation in the system. Therefore, a conventional semiconductor system occasionlly does not operate in a normal state on account of these problems.

SUMMARY OF THE INVENTION

The present invention has been made in view of the above problem, and it is an object of the present invention to provide a semiconductor system for controlling precisely the values of the data which is transferred between a master device and a slave device when the operation of the semiconductor system have beeen increased.

The present invention provides an error-free digital semiconductor system.

The preferred embodiment of the present invention is to provide a semiconductor system for correcting the values of the data which is outputted from a master device.

In accordance with one aspect of the present invention, there is provided a semiconductor system having a master device and a slave device, comprising: data bus and control signal lines coupled between a master device and a slave device; wherein the master device inputs a calibration signal to the slave device in response to control signals transferred through the control signal lines; and wherein the voltage level of the data outputted from the slave device is corrected in response to the calibration signal.

In accordance with another aspect of the present invention, there is provided a semiconductor system having a master device and a slave device, comprising: data bus and control signal lines coupled between a master device and a slave device; wherein the master device inputs first and second calibration signals to the slave device in response to control signals transferred through the control signal lines; wherein the voltage level of the data outputted from the slave device is corrected in response to the first and the second calibration signals; and wherein the first and the second calibration signals are inputted to the slave device through the data bus.

BRIEF DESCRIPTION OF THE DRAWINGS

The above and other objects, features and advantages of the present invention will be more clearly understood from the following detailed description taken in conjunction with the accompanying drawings, in which.

The semiconductor system of the present invention will hereinafter be described with reference to FIGS. 2 and 3.

DETAILED DESCRIPTION OF THE PREFERRED EMBODIMENTS

Figure 1:
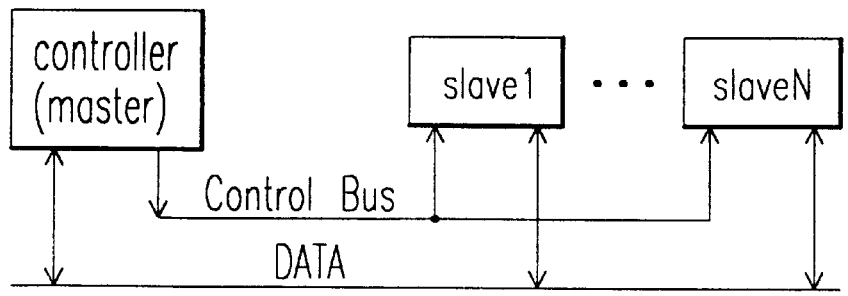
FIG. 1 is a block diagram illustrating the construction of a conventional semiconductor system having a master device and a slave device.
Figure 2:
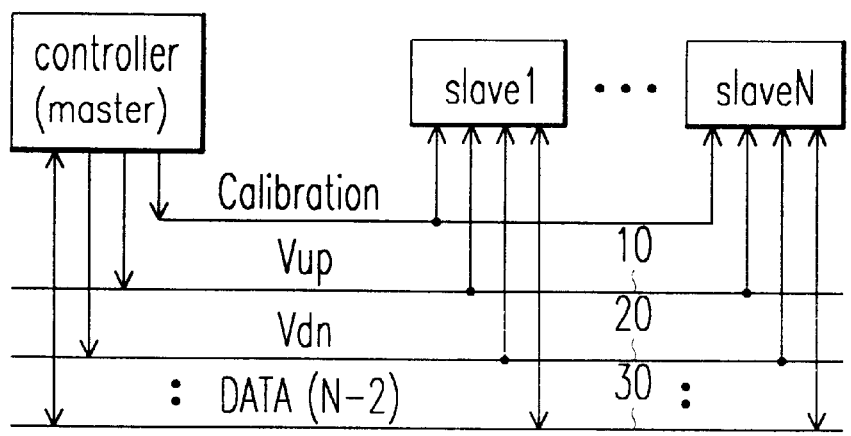
FIG. 2 is a block diagram illustrating the construction of a semiconductor system having a master device and a slave device in accordance with the present invention.

FIG. 2 is a block diagram of a semiconductor system having a master device and a slave device in accordance with the present invention. In FIG. 2, the bus line 10 indicates "high" calibration voltage Vup and the bus line 20 indicates "low" calibration voltage Vdn. Data bus line 30 delivers data outputted from the control device (i.e, master device) into a plurality of the slave devices. However, data bus line 30 may deliver data DATA(N−2) outputted from a plurality of the slave devices into the control device. At this point, DATA(N−2) indicates that the number of the data bus lines is N−2. The other two data bus lines indicates bus lines 10 and 20. Calibration line (i.e. control bus line) is a correction signal line for controlling tha data which is outputted from the slave device.

The control device can control, individually, a plurality of slave devices. In addition, data outputted from the control device may be inputted, individually, to a plurality of slave devices. Data outputted from a plurality of slave devices may be inputted selectively to the control device. The correcting signal Calibration may be inputted individually to a plurality of slave devices.

The operation of the present semicondctor shown in FIG. 2 is as follows.

The control device transfers through the control bus line the correcting signal to at least one of the slave devices and also transfers through the two data bus lines 10 and 20 the "high" calibration voltage Vup and the "low" calibration voltage Vdn to at least one of the slave devices. The "high" calibration voltage Vup and the "low" calibration voltage Vdn which are transferred to the slaves is compared to the value of the data on the data bus lines. If the data value is invalid, it is corrected in a valid voltage level by the "high" calibration voltage Vup and the "low" calibration voltage Vdn.

The operation of the present embodiment in accordance with the present invention will hereinafter be described in detail with reference to FIGS. 3.

Figure 3:
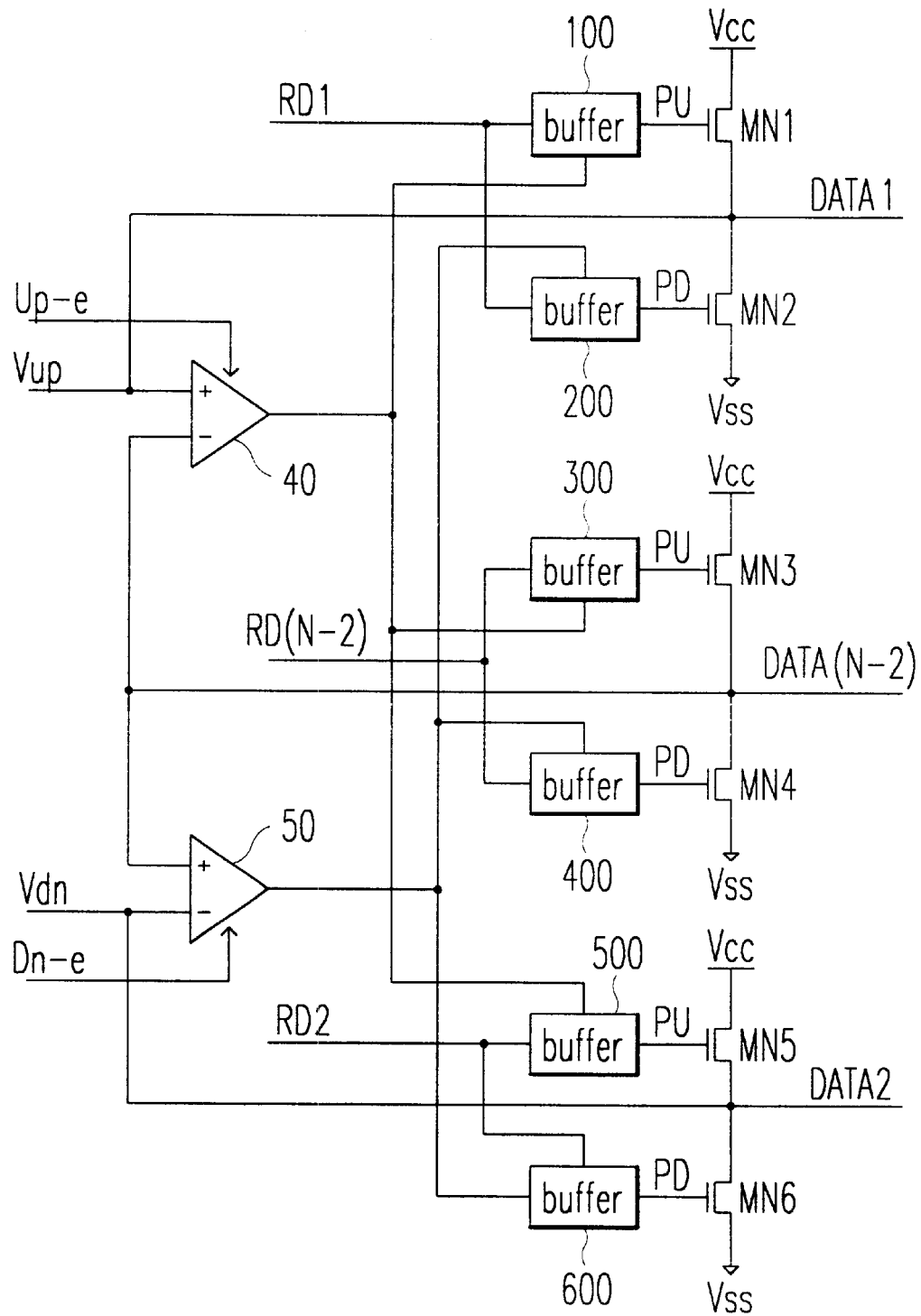
FIG. 3 is a circuit diagram of a data correction device within the slave device in accordance with the present invention.

FIG. 3 is a circuit diagram of a data correction device within the slave device in accordance with the present invention.

The first comparator 40 is enabled by the enable signal Up-e. The positive input terminal of the comparator 40 is coupled to the first data bus line DATA1 and receives the "high" calibration voltage Vup. The negative input terminal of the comparator 40 is coupled to the one of the data bus lines DATA(N-2) and receives the data on the data bus line.

The second comparator 50 is enabled by the enable signal Dn-e. The negative input terminal of the comparator 50 is coupled to the second data bus line DATA2 and receives the "low" calibration voltage Vdn. The positive input terminal of the comparator 50 is coupled to the negative input terminal of the comparator 40.

The first buffer 100 receives internal read data RD1 and output signal from the comparator 40 as a control signal. The third buffer 300 receives one of the internal read datas RD(N-2) and output signal from the comparator 40 as a control signal. The fifth buffer 500 receives the internal read data RD2 and output signal from the comparator 40 as a control signal. The second buffer 200 receives internal read data RD1 and output signal from the comparator 50 as a control signal. The fourth buffer 400 receives one of the internal read data RD(N-2) and output signal from the comparator 50 as a control signal. The sixth buffer 600 receives the internal read data RD2 and output signal from the comparator 50 as a control signal.

The first pull-up transistor MN1 is coupled between power supply voltage terminal Vcc and the first data line DATA1 and its gate is coupled to the output terminal of the first buffer 100. The first pull-down transistor MN2 is coupled between the first data line DATA1 and ground voltage terminal Vss and its gate is coupled to the output terminal of the second buffer 200.

The second pull-up transistor MN3 is coupled between power supply voltage terminal Vcc and one of the data lines DATA(N-2) and its gate is coupled to the output terminal of the third buffer 300. The second pull-down transistor MN4 is coupled between one of the data lines DATA(N-2) and ground voltage terminal Vss and its gate is coupled to the output terminal of the fourth buffer 400.

The third pull-up transistor MN5 is coupled between power supply voltage terminal Vcc and the second data line DATA2 and its gate is coupled to the output terminal of the fifth buffer 500. The third pull-down transistor MN6 is coupled between the second data line DATA2 and ground voltage terminal Vss and its gate is coupled to the output terminal of the second buffer 600.

As illustrated in FIG. 2, the present embodiment can conduct, simultaneously, the correction process to N slave devices, and also conduct, selectively, to arbitrary slave devices. This correction process is accomplished by the use of the specific instruction signal (not shown) which is outputted from the control device. For example, if the slave device 1 in FIG. 2 has to be corrected, a specific instruction is inputted to the slave device 1 so as to activate only the slave device 1. If all the slave devices have to be corrected, a specific instruction is inputted to all the slave devices so as to activate simultaneously all the slave devices.

The operation of the data correction process in accordance with the present invention will hereinafter be described in detail with reference to FIGS. 3.

The data calibration device in FIG. 3 is embodied into the each of the slave devices in FIG. 2.

The data calibration device in FIG. 3 include comparators 40 and 50 each of which receives calibration voltage Vup and Vdn. Up-e and Dn-e are enable signals which activates the comparators. RD is a abbreviation of the read data outputted from the internal circuit within the slave device. For example, it indicates the read data which is outputted from the memory device by the read operation.

The operation mode of the data calibration device is divided into normal mode and calibration mode.

In normal mode, bus lines 10, 20 and 30 are only used as a data bus line. The comparator 40 and 50 are inactive in this mode. Therefore, the function of the buffers 100, 200, 300, 400, 500 and 600 is only to receive and buffer the read data outputted from the internal circuit within the slave device. If the read data are a high level, pull-up transistors are drived. If the read data are a low level, pull-down transistors are drived. Thereafter, the read data are inputted through the data bus lines to the control device.

In calibration mode, the control device corrects the voltage level of the read data outputted from the slave device. In other words, this mode corrects the voltage level of the read data transferred through the data bus line. In this mode, the calibration voltages Vup and Vdn are inputted to the slave devices through the data bus line 10 and 20. The comparators 40 and 50 receive the calibration voltages and data on the data bus line and compares them.

In calibration mode, the control device inputs "high" calibration voltage Vup and "low" calibration voltage Vdn into the slave device through the data lines 10 and 20 (i.e. DATA1 and DATA2). The comparator 40 operates only in this mode and the positive input terminal of the comparator 40 is coupled to the data DATA1 on the data bus line 10.

The output signal from the comparator 40 is inputted to the pull-up buffers 100, 300 and 500. The output signal from the comparator 50 is inputted to the pull-down buffers 200, 400 and 600. The pull-up buffers 100, 300 and 500 receive the output signal from the comparator 40 and drives the pull-up transistors MN1, MN3 and MN5. The pull-down buffers 200, 400 and 600 receive the output signal from the comparator 50 and drives the pull-down transistors MN2, MN4 and MN6.

For example, let's examine the case that the slave device 1 in FIG. 2 only has to be corrected. The control device outputs a certain instruction signal for controlling only the slave device 1 in FIG. 2. Therefore, the other slave devices are not selected.

As shown in FIG. 2, the slave device 1 is coupled to the master device through N data bus lines. Accordingly, a certain data on an arbitrary data bus line may be corrected or all data on the all data lines may be corrected. DATA(N−2) and RD(N−2) may indicate an arbitrary data.

The first comparator 40 compares a "high" calibration voltage and an arbitrary data. The second comparator 50 compares a "low" calibration voltage and an arbitrary data. In the case where N−2 data should be compared to the "high" calibration voltage or the "low" calibration voltage, 2(N−2) comparators are necessary. In this case, each calibration voltage is inputted to each of the 2(N−1) comparators.

It will be described in detail the operation of the data calibration device with reference to FIG. 3.

Firstly, it will be illustrated the case that the high level of the the data (e.g. DATA(N−2)) on the data bus line 30 in FIG. 2 is corrected.

The instruction signal for the "high" calibration voltage is inputted from the control device to the selected slave device.

Then, enable signal Up-e of the comparator 40 is activated. At this point, enable signal Dn-e of the comparator 50 maintains inactive state. The "high" calibration voltage Vup and the data DATA(N−2) on the data bus line 30 are inputted to the comparator 40 as shown in FIG. 3. The "high" calibration voltage Vup is supplied through the data bus line DATA1. The comparator 40 compares the "high" calibration voltage Vup and the data DATA(N−2).

If the voltage level of the "high" calibration voltage Vup is higher than the voltage level of the data DATA(N−2), the output signal from the comparator 40 is high level. Accordingly, the pull-up buffers 100, 300 and 500 are activated. The activated pull-up buffers increase the voltage level which is to be inputted to the gates of the pull-up transistors MN1, MN3 and MN5. Accordingly, pull-up transistors can supply higher voltage onto the data bus lines.

If the voltage level of the "high" calibration voltage Vup is lower than the voltage level of the data DATA(N−2), the output signal from the comparator 40 is low level. Accordingly, the pull-up buffers 100, 300 and 500 are inactivated. Because the voltage level of the data is sufficiently high, there is no reason to drive the pull-up buffers in order to increase the voltage level to be inputted to the gates of the pull-up transistors MN1, MN3 and MN5. In other words, pull-up transistors previously have supplied sufficient high voltage onto the data bus lines.

Secondly, it will be illustrated the case that the low level of the the data (e.g. DATA(N−2)) on the data bus line 30 in FIG. 2 is corrected.

The instruction signal for the "low" calibration voltage is inputted from the control device to the selected slave device.

Then, enable signal Dn-e of the comparator 50 is activated. At this point, enable signal Up-e of the comparator 40 maintains inactive state. The "low" calibration voltage Vdn and the data DATA(N−2) on the data bus line 30 are inputted to the comparator 50 as shown in FIG. 3. The "low" calibration voltage Vup is supplied through the data bus line DATA2. The comparator 50 compares the "low" calibration voltage Vup and the data DATA(N−2).

If the voltage level of the "low" calibration voltage Vdn is lower than the voltage level of the data DATA(N−2), the output signal from the comparator 50 is high level. Accordingly, the pull-down buffers 200, 400 and 600 are activated. The activated pull-up buffers increase the voltage level which is to be inputted to gates of the pull-down transistors MN2, MN4 and MN6. Accordingly, pull-down transistors can supply lower voltage onto the data bus lines.

If the voltage level of the "low" calibration voltage Vdn is higher than the voltage level of the data DATA(N−2), the output signal from the comparator 50 is low level. Accordingly, the pull-up buffers 200, 400 and 600 are inactivated. Because the voltage level of the data is sufficiently low, there is no reason to drive the pull-down buffers in order to increase the voltage level to be inputted to the gates of the pull-down transistors MN2, MN4 and MN6. In other words, pull-down transistors previously have supplied sufficiently low voltage onto the data bus lines.

Lastly, after the calibration mode is completed, normal node is started.

The read data RD1, RD2, . . . RDN are inputted to the input buffers.

In normal mode operation, if the read data are high, the pull-up buffers are activated. The function of the pull-up buffers is sufficiently improved by the calibration mode operation. Therefore, the enabled pull-up transistors can supply a sufficient high voltage onto the data bus lines.

In normal mode operation, if the read data are low, the pull-down buffers are activated. The function of the pull-down buffers is sufficiently improved by the calibration mode operation. Therefore, the enabled pull-down transistors can supply a sufficiently low voltage onto the data bus lines.

As is apparent from the above description, according to the present invention, the data calibration device within the slave device provides the pull-up buffers and the pull-down buffers each of which control the pull-up transistors and the pull-down transistors to output the valid data. The pull-up and the pull-down buffers controls the pull-up and the pull-down transistors to correct the voltage values of the data to be outputted onto the data lines.

The present invention corrects the data to be transferred from the slave device to the control device, the master device, and improves the stability of the system by this correction operation.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A semiconductor system having a master means and a slave means, comprising:
    data bus lines and control signal lines coupled between the master means and the slave means;
    wherein the master means inputs a calibration signal to the slave means in response to control signals transferred through the control signal lines; and the voltage level of data outputted from the slave means is corrected in response to the calibration signal to maintain a desired outgoing voltage level from said slave means.

2. The semiconductor system having a master device and a slave device, as set forth in claim 1:
    wherein the slave means further including data calibration means, said data calibration means having comparator means for comparing the calibration signal with the data, and buffer means controlled by an output signal from the comparator means; and
    wherein the voltage level of the data to be outputted onto the data bus lines is corrected in response to an output signal from the buffer means.

3. The semiconductor system having a master device and a slave device, as set forth in claim 2:

wherein said data calibration means further including pull-up means and pull-down means each of which is controlled by the output signal from the buffer means; and wherein the pull-up means and the pull-down means are coupled to the data bus lines.

4. The semiconductor system having a master device and a slave device, as set forth in claim 1:

wherein the calibration signal is inputted to the slave means through the data bus lines.

5. The semiconductor system having a master device and a slave device, as set forth in claim 1:

wherein the slave means includes a first comparator means for comparing a first calibration signal from said master with first data on the data bus lines to generate a first output signal, and a second comparator means for comparing a second calibration signal from said master with second data on the data bus lines to generate a second output signal, said first output signal determining an increase in voltage output and said second output signal determining a decrease in voltage output.

6. The semiconductor system as set forth in claim 5, further comprising pull-up means responsive to said first output signal, and pull-down means responsive to said second output signal.

7. The semiconductor system as set forth in claim 6, wherein said pull-up means increases voltage output when said first output signal is high level indicating said first calibration signal was higher than said first data.

8. The semiconductor system as set forth in claim 6, wherein said pull-down means decreases voltage output when said second output signal is high level indicating said second calibration signal was lower than said second data.

9. The semiconductor system as set forth in claim 6, further comprising pull-up buffer means for receiving said first output signal and for controlling said pull-up means, and pull-down buffer means for receiving said second output signal and for controlling said pull-down means.

10. The semiconductor system having a master device and a slave device, as set forth in claim 1:

wherein the slave means includes a first comparator means for comparing a first calibration signal from said master with first data on the data bus lines to generate a first output signal, and a second comparator means for comparing a second calibration signal from said master with second data on the data bus lines to generate a second output signal, said first comparator means and said second comparator means being alternatively enabled.

11. The semiconductor system having a master device and a slave device as set forth in claim 10, further comprising pull-up means responsive to said first output signal, and pull-down means responsive to said second output signal, a high level of said first output signal indicating the first calibration signal has a value higher than a value of the first data and activating said pull-up means, and a high level of said second output signal indicating the second calibration signal has a value lower than a value of the second data and activating said pull-down means.

12. A semiconductor system having a master means and a slave means, comprising:

data bus lines and control signal lines coupled between the master means and the slave means;

wherein the master means inputs first and second calibration signals to the slave means in response to control signals transferred through the control signal lines; the voltage level of data outputted from the slave means is corrected in response to the first and the second calibration signals; and the first and the second calibration signals are inputted to the slave means through the data bus lines.

13. The semiconductor system having a master device and a slave device, as set forth in claim 12:

wherein the slave means further including data calibration means; and wherein said data calibration means having first comparator means for comparing the first calibration signal with first data on the data bus lines, second comparator means for comparing the second calibration signal with second data on the data bus lines, pull-up buffer means controlled by an output signal from the first comparator means, pull-down buffer means controlled by an output signal from the second comparator means, pull-up means controlled by the pull-up buffer means, and pull-down means controlled by the pull-down buffer means.

14. The semiconductor system having a master device and a slave device, as set forth in claim 13:

wherein the first comparator means and the second comparator means are alternatively enabled.

15. The semiconductor system having a master device and a slave device, as set forth in claim 13:

wherein the pull-up means and the pull-down means are coupled to the data bus lines; wherein if a value of the first calibration signal is higher than a value of the first data, the pull-up buffer is controlled by the first comparator in order to control the pull-up means; and wherein if a value of the second calibration signal is lower than a value of the second data, the pull-down buffer is controlled by the second comparator in order to control the pull-down means.

16. A semiconductor system having a master means and a slave means, comprising:

data bus lines and control signal lines coupled between the master means and the slave means;

means for increasing and decreasing, alternatively, a voltage level of data outputted from said slave means, said increasing and decreasing means coupled to said data bus lines;

wherein the master means inputs a calibration signal to the slave means in response to control signals transferred through the control signal lines; and the voltage level of the data outputted from the slave means is alternatively increased and decreased in response to said calibration signal to maintain a desired outgoing voltage level of said data outputted from said slave means.

17. The semiconductor system having a master means and a slave means, as set forth in claim 16:

said means for increasing and decreasing including pull-up means and pull-down means.

18. The semiconductor system having a master means and a slave means, as set forth in claim 17:

said slave means including comparator means for comparing the calibration signal with data on the data bus lines, relative values of said calibration signal and said data determining which of said pull-up means and said pull-down means is activated.

* * * * *